US008297299B2

(12) United States Patent
Pan

(10) Patent No.: US 8,297,299 B2
(45) Date of Patent: Oct. 30, 2012

(54) CHECK VACUUM BREAKING DEVICE FOR A TAP

(75) Inventor: Jui-Lu Pan, Lugang Township, Changhua County (TW)

(73) Assignee: Ring Rich Industrial Co., Ltd., Changhua County (TW)

( * ) Notice: Subject to any disclaimer, the term of this patent is extended or adjusted under 35 U.S.C. 154(b) by 549 days.

(21) Appl. No.: 12/497,565

(22) Filed: Jul. 3, 2009

(65) Prior Publication Data

US 2011/0000557 A1    Jan. 6, 2011

(51) Int. Cl.
*E03C 1/10* (2006.01)
*F16K 24/00* (2006.01)

(52) U.S. Cl. .......................... 137/217; 251/333
(58) Field of Classification Search .............. 137/217, 137/218, 526, 143, 549; 251/333, 334
See application file for complete search history.

(56) References Cited

U.S. PATENT DOCUMENTS

| 3,454,032 | A | * | 7/1969 | Hinz et al. | 137/218 |
| 3,565,097 | A | * | 2/1971 | Costa et al. | 137/218 |
| 4,050,473 | A | * | 9/1977 | Cho | 137/244 |
| 4,249,717 | A | * | 2/1981 | Thompson | 251/210 |
| 5,937,889 | A | * | 8/1999 | Krieg | 137/218 |
| 6,123,095 | A | * | 9/2000 | Kersten et al. | 137/218 |
| 6,904,931 | B2 | * | 6/2005 | Stephens | 137/218 |

FOREIGN PATENT DOCUMENTS

GB              686404        *  6/1951

* cited by examiner

*Primary Examiner* — Craig Schneider
*Assistant Examiner* — Seth Faulb
(74) *Attorney, Agent, or Firm* — Alan Kamrath; Kamrath IP Lawfirm, PA

(57) ABSTRACT

A check vacuum breaking device for a tap includes a locking member screwed into a chamber of a tap. The chamber includes an inlet and an outlet. The locking member includes a cover member secured on a top end thereof and having plural air bores disposed around a rim of the cover member, and a shaft extends downward from a center of a bottom surface of the cover member. A fitting member is assembled to the chamber of the tap and includes a hollow peg extending upward from a central portion thereof and having a closed bottom to be fitted to the shaft of the locking member. The hollow peg includes a stepped recess formed on an upper end thereof, and a stopping pad is fitted to the stepped recess. The fitting member includes an annular loading member fitted to a lower end thereof and an anti-leak loop to cover the loading member.

4 Claims, 7 Drawing Sheets

CHECK VACUUM BREAKING DEVICE FOR A TAP

BACKGROUND OF THE INVENTION

1. Field of the Invention

The present invention relates to a tap structure and, more particularly, to a check vacuum breaking device for a tap that can prevent polluted water and impurities from polluting a piping system and can prevent frozen water from obstructing the piping system.

2. Description of the Prior Art

A conventional tap capable of supplying water includes a check vacuum breaking device installed therein to prevent polluted water and impurities from polluting a piping system because of siphonage and to prevent water from remaining therein.

With reference to FIGS. 6-8, a conventional check vacuum breaking device for a tap comprises a check member 5, a pressing member 6 made of metal material, and a pushing member 7. The check member 5 is formed in a y-shaped tube shape. The y-shaped check member 5 includes an inflow end 51, an outflow end 52, and an air-admitting end 53. The pressing member 6 is formed in a T shape, and an upper body 61 of the pressing member 6 engages with the air-admitting end 53 of the check member 5 and includes a plurality of air holes 611 arranged around a peripheral side thereof. The pushing member 7 includes a guiding pillar 71 extending to a central opening of the pressing member 6 and an anti-leak loop 73 fitted onto a stepped segment 72 thereof. As the check member 5 is in a water flowing state, the anti-leak loop 73 of the pushing member 7 attaches on a central rim 62 of the pressing member 6 with a vacuum. With the water supply stopped, the pushing member 7 can apply gravity and air to break a vacuum attaching state between the pressing member 6 and the pushing member 7 and to engage an opening of the inflow end 51 of the check member 5, thereby preventing water from flowing backward.

However, such a conventional check vacuum breaking device still has the following disadvantages:

1. As the water supply stops, the pushing member 7 moves backward to engage the opening of the inflow end 51 of the check member 5 to stop back-flowing of the water. However, the pushing member 7 and the opening of the inflow end 51 can not be closed to obtain a check function when an object gets stuck between the pushing member 7 and the opening of the inflow end 51.

2. The pushing member 7 made of metal material causes a high production cost. However, if the pushing member 7 is made of plastic material, its weight is too light to move backward to engage the opening of the inflow end 51.

The present invention has arisen to mitigate and/or obviate the afore-described disadvantages.

SUMMARY OF THE INVENTION

The primary object of the present invention is to provide a check vacuum breaking device for a tap that as water supply is stopped, the stopping pad of the fitting member contacts with the outlet of the chamber of the tap tightly to stop waterflow flowing backward because of siphonage, thus preventing polluted water from flowing backward to pollute the piping system. Also, if an object gets stuck between the stopping pad of the fitting member and the outlet of the chamber, the abutting portion of the stopping pad stops the object from obstructing between the stopping pad and the outlet continuously.

Another object of the present invention is to provide a check vacuum breaking device for a tap with the loading member disposed on the lower end of the fitting member and covered by the stopping pad. Therefore, the fitting member can be made of plastic material to lower production cost and can displace downward freely by using the loading member.

A check vacuum breaking device for a tap in accordance with a preferred embodiment of the present invention includes a locking member and a fitting member. The locking member is screwed into a chamber of a tap. The chamber includes an inlet and an outlet. The locking member includes a cover member secured on a top end thereof and having a plurality of air bores disposed around a rim of the cover member, and a shaft extends downward from a center of a bottom surface of the cover member. The fitting member is assembled to the chamber of the tap and includes a hollow peg extending upward from a central portion thereof and having a closed bottom to be fitted to the shaft of the locking member, and a stepped recess is formed on an upper end of the hollow peg. A stopping pad is fitted to the stepped recess. The fitting member includes a loading member fitted to a lower end thereof and an anti-leak loop to cover the loading member. The loading member is formed in a loop shape. The stopping pad includes an abutting portion.

DETAILED DESCRIPTION OF THE PREFERRED EMBODIMENTS

The present invention will be clearer from the following description when viewed together with the accompanying drawings, which show, for purpose of illustration only, the preferred embodiments in accordance with the present invention.

Figure 1:
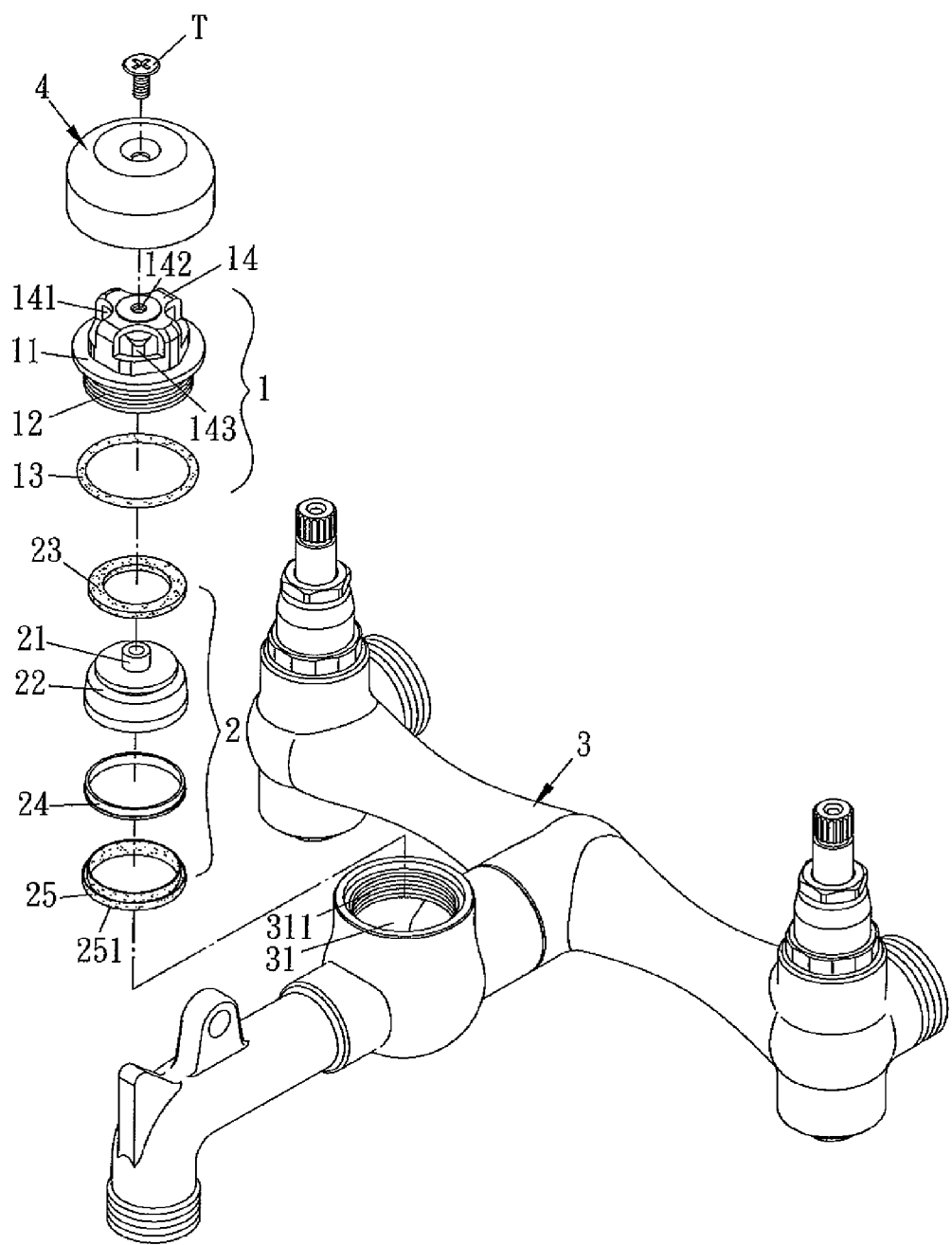
FIG. 1 is a perspective view showing the exploded components of a check vacuum breaking device for a tap in accordance with a preferred embodiment of the present invention.
Figure 2:
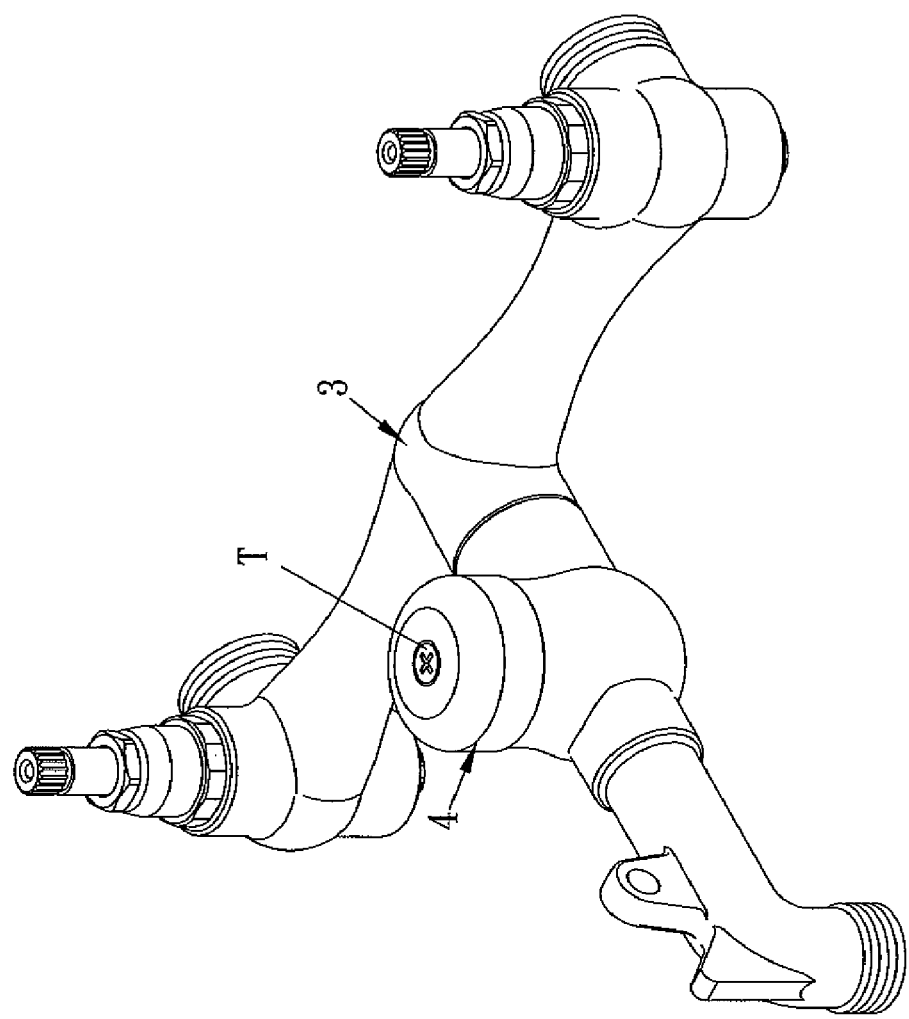
FIG. 2 is a perspective view showing the assembly of the check vacuum breaking device for the tap in accordance with the preferred embodiment of the present invention.
Figure 3:
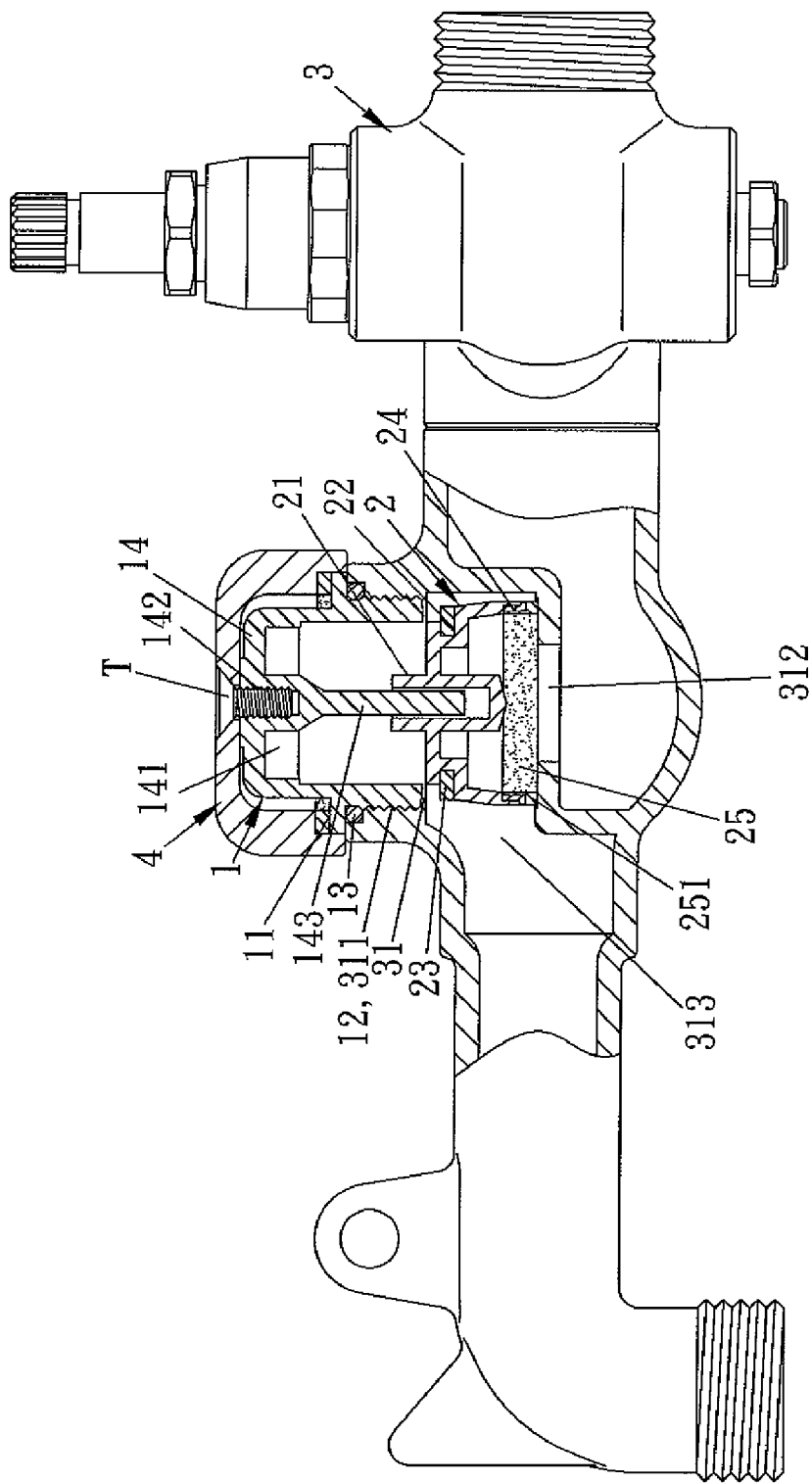
FIG. 3 is a cross sectional view showing the assembly of the check vacuum breaking device for the tap in accordance with the preferred embodiment of the present invention.

Referring to FIGS. 1-3, a check vacuum breaking device for a tap comprises a locking member 1 and a fitting member 2. The locking member 1 is hollow and includes an upper body 11 disposed on a middle section thereof. An outer threading end 12 is formed under the upper body 11, and a stop ring 13 is fitted to the outer threading end 12, such that the locking member 1 is screwed into a chamber 31 of a tap 3 by using the outer threading end 12 so that the upper body 11 and the stop ring 13 abuts against the chamber 31. Hence, the locking member 1 closes the chamber 31 of the tap 3. The chamber 31 of the tap 3 includes a screwing orifice 311 mounted on a top end thereof, an inlet 312 arranged on a bottom end thereof, and an outlet 313 fixed on a peripheral side of a lower section thereof. The locking member 1 includes a cover member 14 secured on a top end thereof and having a plurality of air bores 141 disposed around a rim of the cover member 14. A screw aperture 142 is mounted on a center of a top surface of the cover member 14 to screw with a bolt T to lock a casing 4 onto the cover member 14. A shaft 143 extends downward from a center of a bottom surface of the cover member 14 and then extends out of the locking member 1. The fitting member 2 is formed in a hat shape and assembled to the chamber 31 of the tap 3. A hollow peg 21 extends upward from a central portion thereof and has a closed bottom to be fitted to the shaft 143 of the locking member 1 and to limit a vertical displacement of the fitting member 2. The fitting member 2 also includes a stepped recess 22 formed on an upper end thereof, an anti-leak loop 23 fitted to the stepped recess 22, an annular loading member 24 fitted to a lower end thereof, and a stopping pad 25 with an abutting portion 251 to cover the loading member 24.

Figure 4:
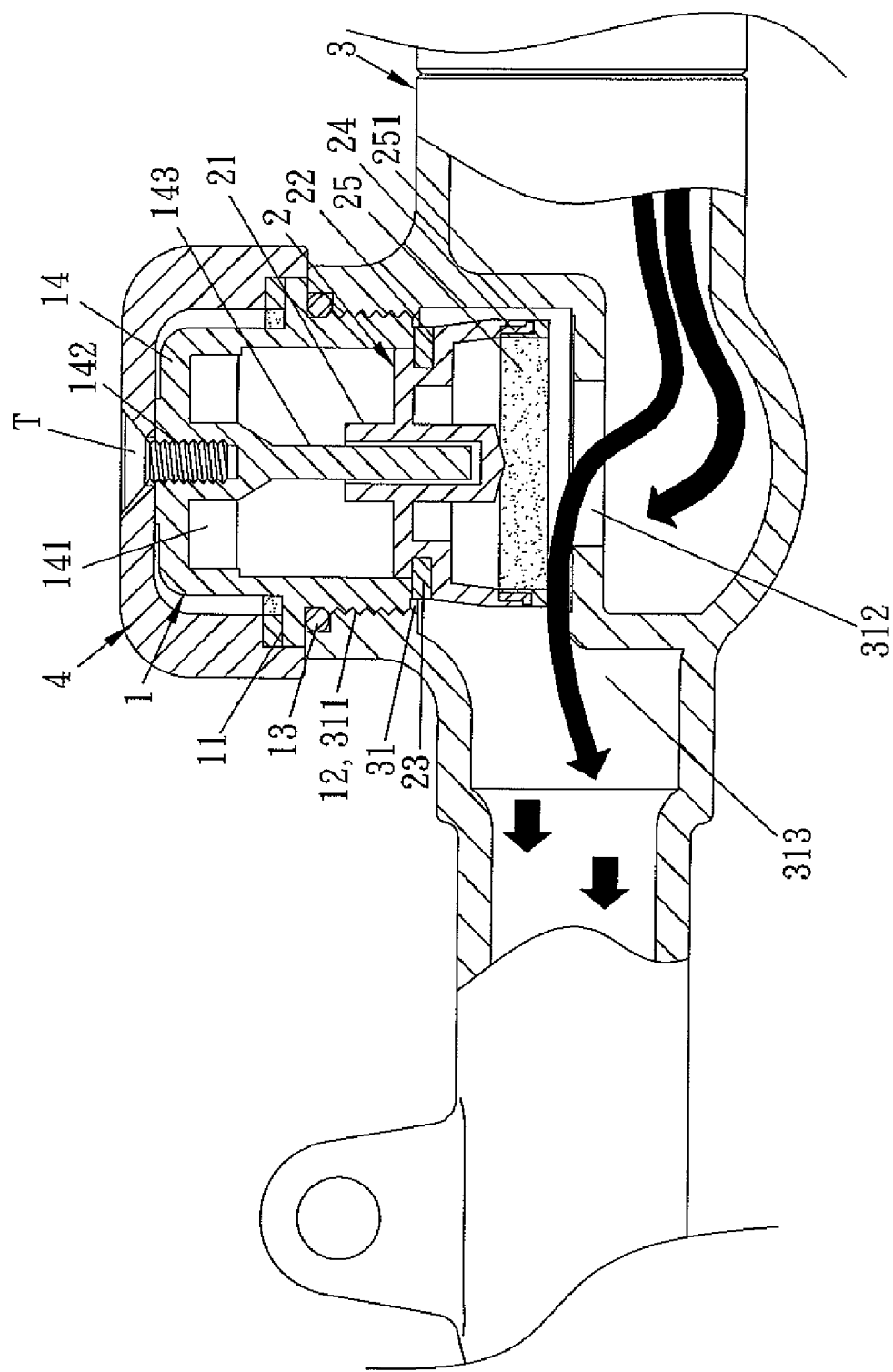
FIG. 4 is a cross sectional view showing a water-flowing state of the check vacuum breaking device for the tap in accordance with the preferred embodiment of the present invention.

As water flows from the tap 3 as shown in FIG. 4, the fitting member 2 is pushed by the water to move upward along the hollow peg 21 and the shaft 143 so that the anti-leak loop 23 is biased against a lower end of the locking member 1 to generate a closed status. Thus, water flows into the inlet 312 of the chamber 31 of the tap 3 and then flows out of the outlet 313.

Figure 5:
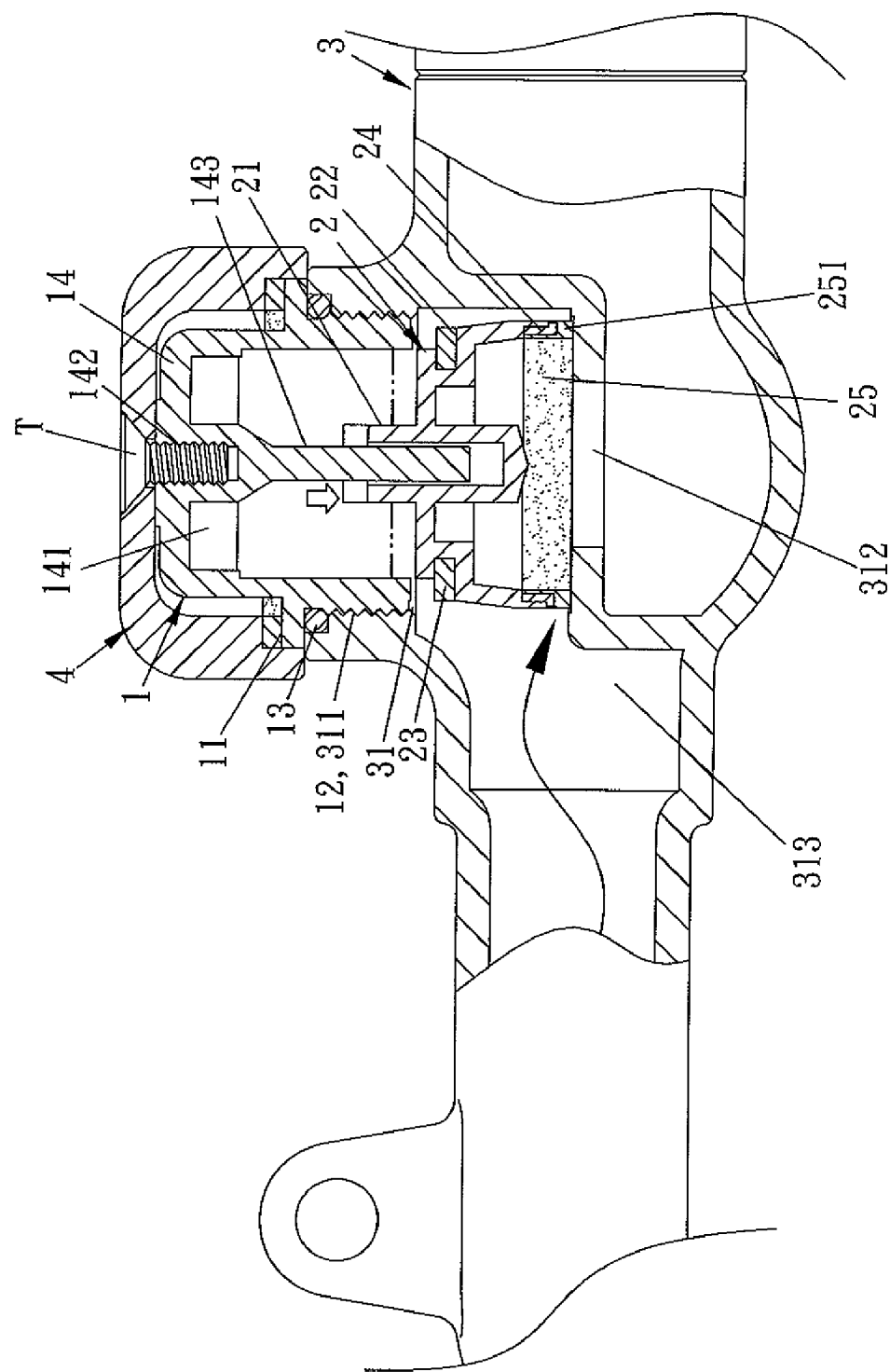
FIG. 5 is a cross sectional view showing a water-stopping state of the check vacuum breaking device for the tap in accordance with the preferred embodiment of the present invention.
Figure 6:
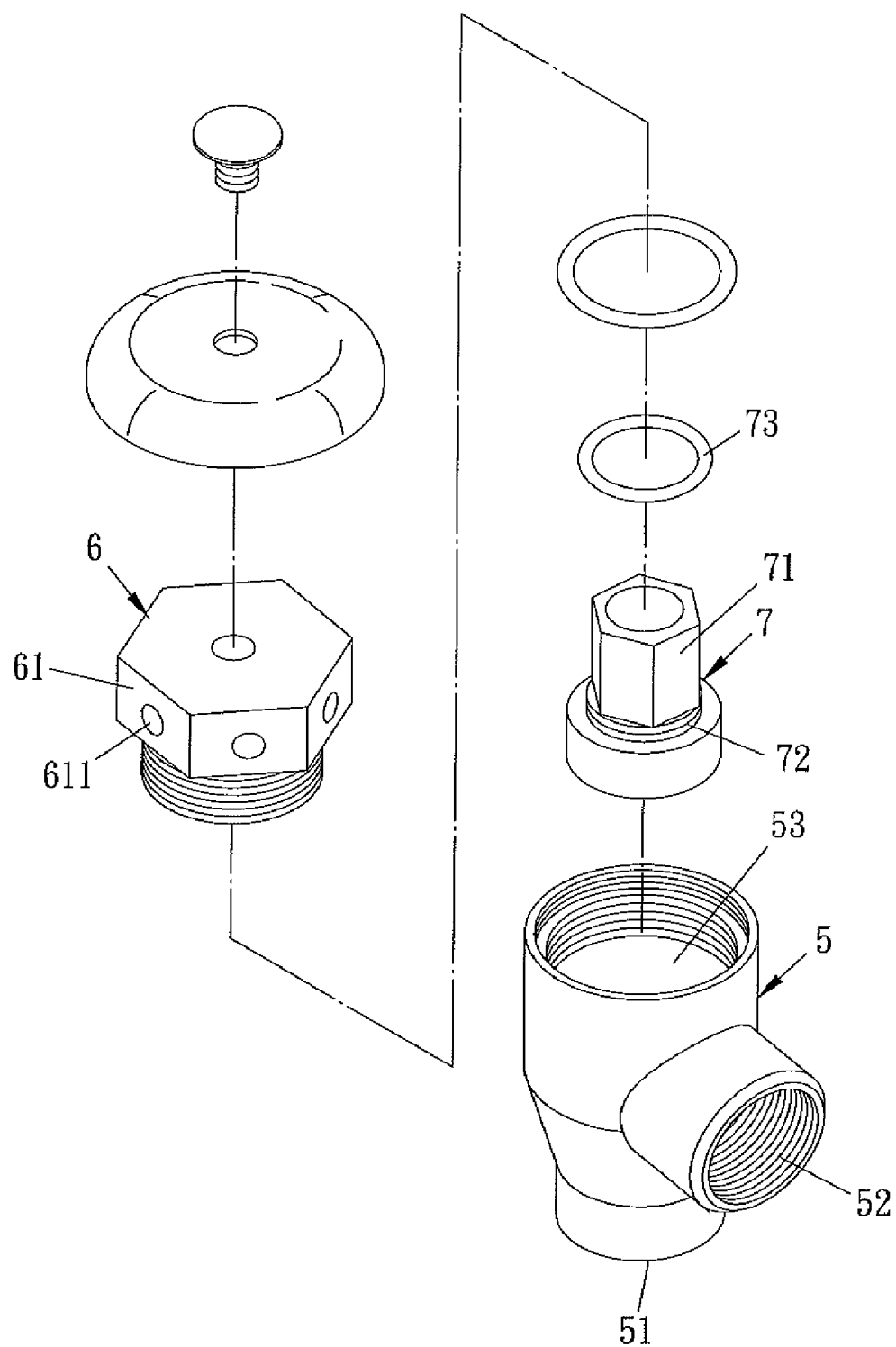
FIG. 6 is a perspective view showing the exploded components of a conventional check vacuum breaking device for a tap.
Figure 8:
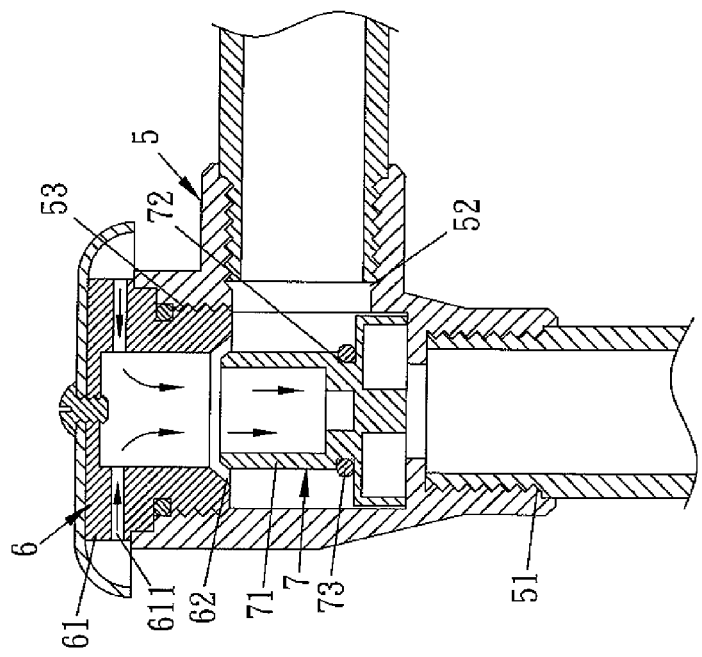
FIG. 8 is a cross sectional view showing a water-stopping state of the conventional check vacuum breaking device for the tap.
Figure 7:
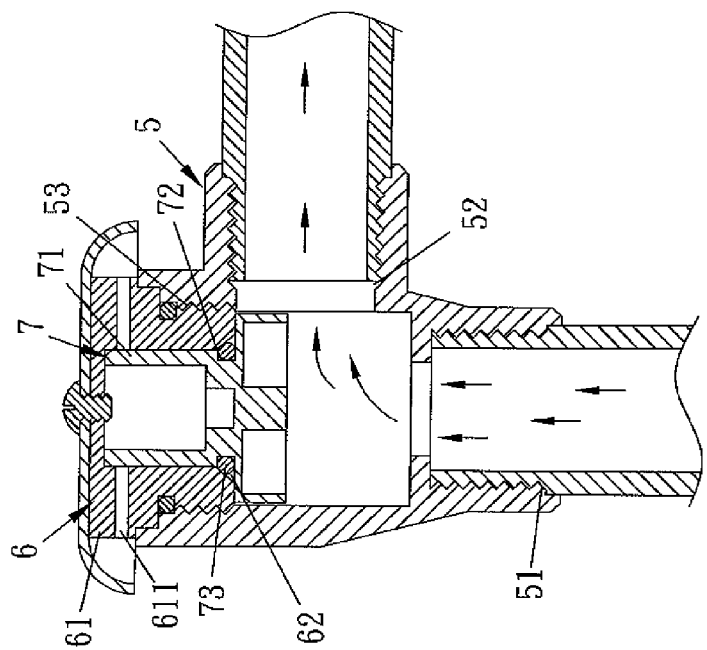
FIG. 7 is a cross sectional view showing a water-flowing state of the conventional check vacuum breaking device for the tap.

When stopping the water as illustrated in FIG. 5 and since the fitting member 2 is not pushed by the water any more, the fitting member 2 moves downward along the hollow peg 21 and the shaft 143 due to the weight of the loading member 24. Thus, a peripheral side of the inlet 312 of the chamber 3 is closed, such that if a siphonage is generated, polluted water and impurities are stopped from flowing back to a piping system from the outlet 313 via the inlet 312. Also, the anti-leak loop 23 of the fitting member 2 disengages from the lower end of the locking member 1 so that exterior air flows to the chamber 31 of the tap 3 from the air bore 141 of the locking member 1, thereby forming a vacuum breaking state to flow water freely. In a frigid zone, the check vacuum breaking device of the present invention can be used to prevent the piping system from being obstructed because remained water becomes frozen.

It is apparent form the above description that the present invention has the following advantages:

1. When stopping the water supply, the stopping pad 25 of the fitting member 2 contacts with the inlet 312 of the chamber 31 of the tap 3 tightly to stop waterflow flowing backward because of siphonage, thus preventing polluted water from flowing backward to pollute the piping system. Also, if an object gets stuck between the stopping pad 25 of the fitting member 2 and the inlet 312 of the chamber 31, the abutting portion 251 of the stopping pad 25 stops the object from obstructing between the stopping pad 25 and the inlet 312 continuously.

2. The loading member 24 is disposed on the lower end of the fitting member 2 and covered by the stopping pad 25. Therefore, the fitting member 2 can be made of plastic material to lower production cost and can displace downward freely by using the loading member 24.

While various embodiments in accordance with the present invention have been shown and described, it is clear to those skilled in the art that further embodiments may be made without departing from the scope of the present invention.

What is claimed is:

1. A check vacuum breaking device for a tap comprises:
   a locking member;
   a fitting member, wherein the locking member is screwed into a chamber of a tap, wherein the chamber includes an inlet and an outlet, wherein the locking member includes a cover member secured on a top end thereof and having a plurality of air bores disposed around a rim of the cover member, with the locking member having a shaft extending downward from a center of a bottom surface of the cover member, wherein the fitting member is assembled to the chamber of the tap and includes a hollow peg extending upward from a central portion thereof and having a closed bottom to be fitted to the shaft of the locking member, wherein the fitting member includes a stepped recess formed on an upper end thereof and an annular anti-leak loop fitted to the stepped recess, wherein the fitting member is formed in a hat shape having an annular lower end, wherein the fitting member is formed of plastic material;
   an annular loading member fitted to the annular lower end of the fitting member; and
   an annular stopping pad covering the annular loading member, with the annular loading member being intermediate the annular lower end and the annular stopping pad.

2. The check vacuum breaking device for the tap as claimed in claim 1, wherein the annular stopping pad includes an annular abutting portion, with the annular abutting portion abutting an annular portion of the chamber around the inlet, with the annular stopping pad located intermediate the annular loading member and the annular portion of the chamber around the inlet, with the annular loading member spaced from the annular portion of the chamber around the inlet when the annular abutting portion abuts with the annular portion of the chamber around the inlet.

3. The check vacuum breaking device for the tap as claimed in claim 2, wherein the locking member includes an inner cylindrical surface, wherein the upper end of the fitting member is of a cylindrical shape slideably received in the inner cylindrical surface.

4. The check vacuum breaking device for the tap as claimed in claim 1, wherein the locking member includes an inner cylindrical surface, wherein the upper end of the fitting member is of a cylindrical shape slideably received in the inner cylindrical surface.

* * * * *